(12) United States Patent
Lin (10) Patent No.: US 8,042,871 B2
(45) Date of Patent: Oct. 25, 2011

(54) CHAIR MOUNTING DEVICE FOR A MOTOR-DRIVEN WHEELED VEHICLE

(75) Inventor: Yu-Chan Lin, Yuanlin Township, Changhua County (TW)

(73) Assignee: Giant Manufacturing Co., Ltd. (TW)

( * ) Notice: Subject to any disclaimer, the term of this patent is extended or adjusted under 35 U.S.C. 154(b) by 118 days.

(21) Appl. No.: 12/388,902

(22) Filed: Feb. 19, 2009

(65) Prior Publication Data

US 2010/0084537 A1 Apr. 8, 2010

(51) Int. Cl.
*A47C 1/00* (2006.01)
(52) U.S. Cl. ................................. 297/344.22
(58) Field of Classification Search ............ 297/344.22, 297/344.21; 248/418, 415
See application file for complete search history.

(56) References Cited

U.S. PATENT DOCUMENTS

| | | | | |
|---|---|---|---|---|
| 3,873,054 | A * | 3/1975 | McKee et al. ................. | 248/371 |
| 7,694,930 | B2 * | 4/2010 | Ritter et al. .................... | 248/415 |
| 2001/0013717 | A1 * | 8/2001 | Bowers et al. ........... | 297/344.22 |
| 2003/0189370 | A1 * | 10/2003 | Hemmer et al. ......... | 297/344.11 |

* cited by examiner

*Primary Examiner* — Milton Nelson, Jr.
(74) *Attorney, Agent, or Firm* — Sunstein Kann Murphy & Timbers LLP (57) ABSTRACT

A chair mounting device for mounting a chair on a mounting frame of a motor-driven wheeled vehicle includes a seat post mounted on the mounting frame, a seat stem mounted on a seat of the chair, a locking member movable relative to the seat stem between a locking position to guard against swiveling movement of the stem relative to the seat post and an unlocking position to permit the swiveling movement, a lever mounted on and operable relative to an anchored mount located above the seat, a biasing member disposed to bias the locking member to the locking position, and a pulling cord coupled with the locking member and the lever.

5 Claims, 8 Drawing Sheets

CHAIR MOUNTING DEVICE FOR A MOTOR-DRIVEN WHEELED VEHICLE

BACKGROUND OF THE INVENTION

1. Field of the Invention

This invention relates to a chair mounting device for mounting a chair on a mount frame of a motor-driven wheeled vehicle, more particularly to a chair mounting device which is operable to lock and unlock the chair relative to the mount frame so as to permit or prevent swiveling movement of the seat.

2. Description of the Related Art

Figure 1:
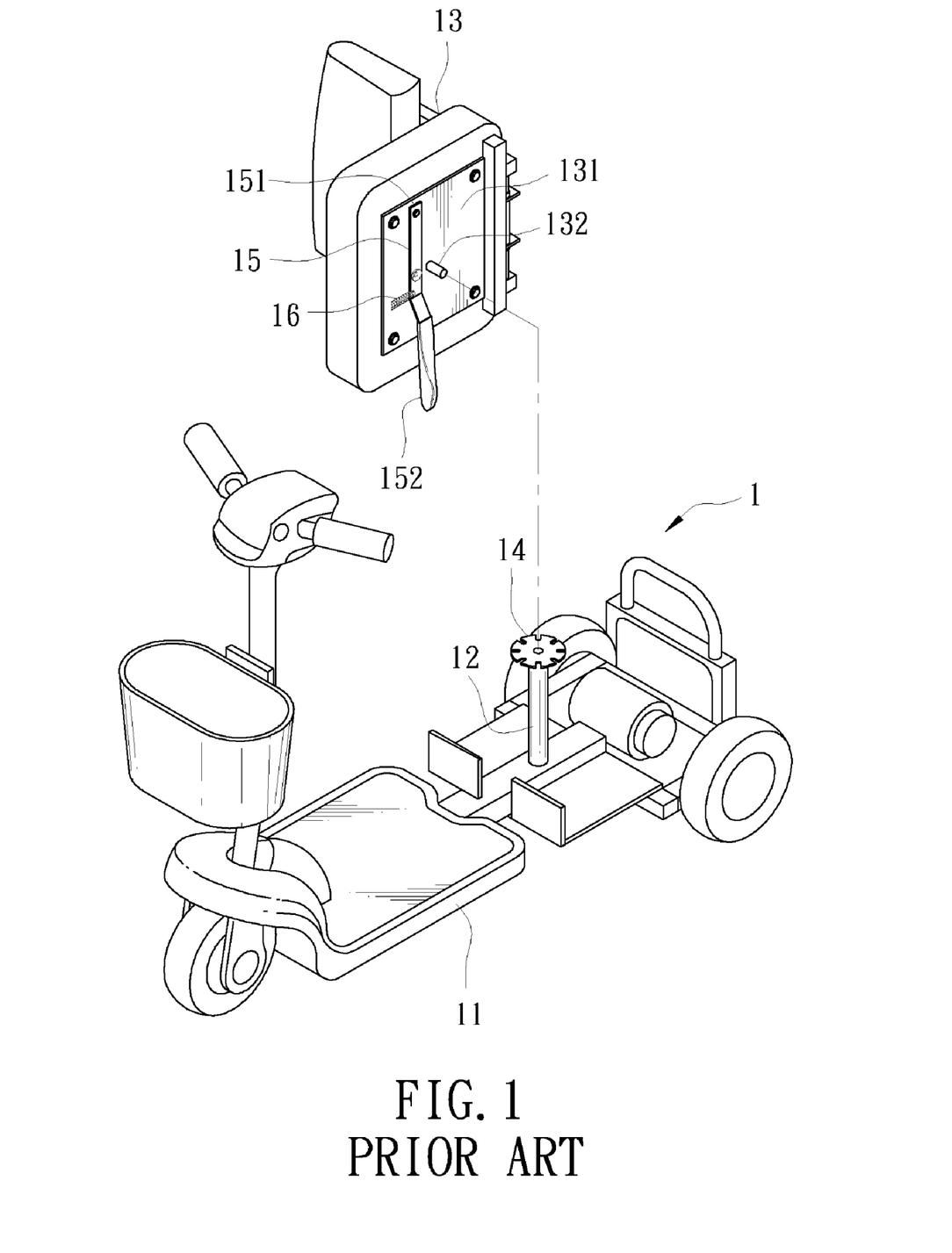
FIG. 1 is an exploded perspective view of a conventional motor-driven wheeled vehicle.
Figure 2:
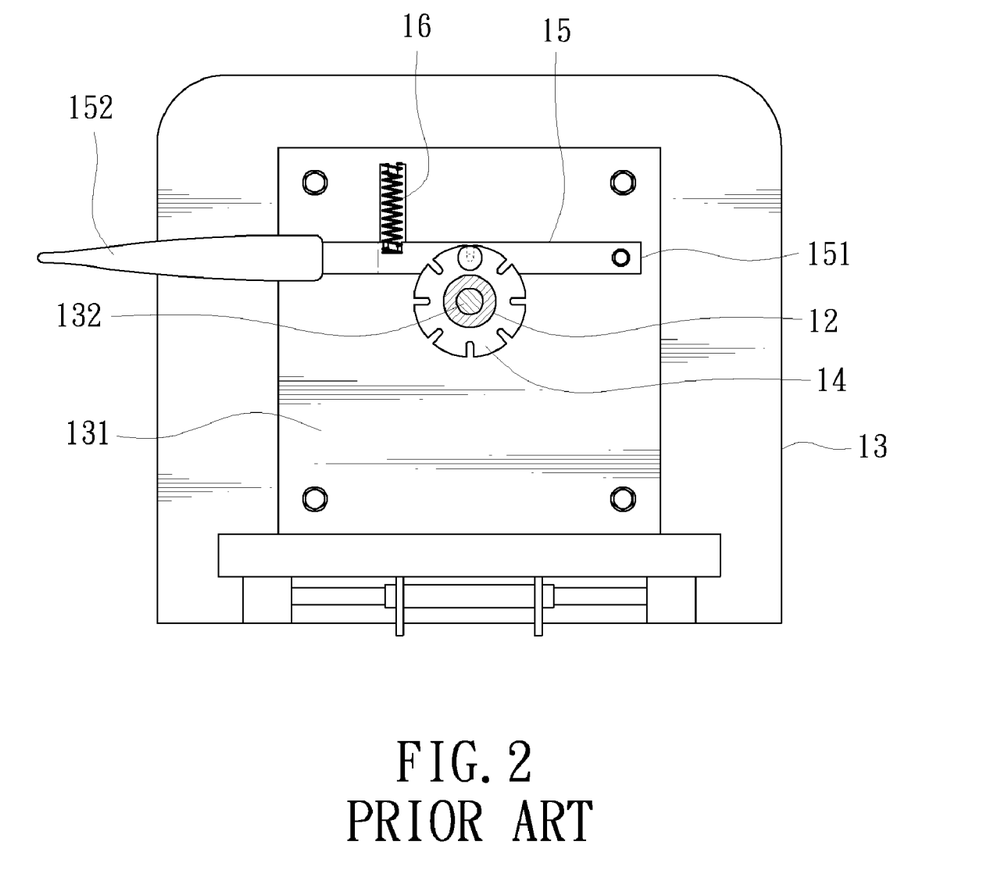
FIG. 2 is a schematic bottom view of a chair mounting device of the conventional motor-driven wheeled vehicle.

Referring to FIGS. 1 and 2, a conventional motor-driven wheeled vehicle 1 (or an electrically driven wheeled chair) is shown to include amount frame 11 with an upwardly extending seat post 12, a chair 13 swivelably mounted on the seat post 12 by insertion of a seat stem 132 on a bottom wall 131 thereof into the seat post 12, a retaining disc 14 secured on the seat post 12, and a pull bar 15 which has a pivot end 151 pivotally mounted on the bottom wall 131, an operated end 152 extending outwardly of the bottom wall 131, and a retaining protrusion 132 engaging the retaining disc 14 such that, by pulling the operated end 152 against a biasing action of a spring 16, the retaining protrusion 132 is moved to disengage from the retaining disc 14 so as to permit swiveling movement of the chair 13 relative to the seat post 12. However, since the pull bar 15 is disposed beneath the chair 13, the user must bend and reach out his/her hand to find the pull bar 15, thereby resulting in inconvenience to the user.

SUMMARY OF THE INVENTION

An object of the present invention is to provide a chair mounting device which is operable in a convenient manner, to lock and unlock a chair relative to a mount frame of a motor-driven wheeled vehicle so as to permit or prevent swiveling movement of the chair.

According to this invention, the chair mounting device for mounting a chair on a mounting frame of a motor-driven wheeled vehicle comprises a seat post adapted to be mounted on and to extend from the mount frame along a swivel axis in an upright direction, and a seat stem which is adapted to be mounted on and to extend from a bottom wall of a seat of the chair, and which is configured to be swivelable relative to the seat post about the swivel axis. A locking member is disposed to be movable relative to the seat stem in a radial direction relative to the swivel axis between a locking position, where the seat stem is guarded against swiveling movement, and an unlocking position, where the seat stem is swivelable. An anchored mount is adapted to suspend from the mounting frame to be located at a position higher than the bottom wall of the seat. A lever is mounted on and is operable relative to the anchored mount. A biasing member is disposed to bias the locking member to the locking position. A pulling cord includes a coupled end coupled with the locking member, and an intermediate segment extending along a guiding route to terminate at an actuated end which is coupled with the lever such that, by means of operation of the lever relative to the anchored mount, the pulling cord is pulled against a biasing action of the biasing member to displace the locking member from the locking position to the unlocking position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 3:
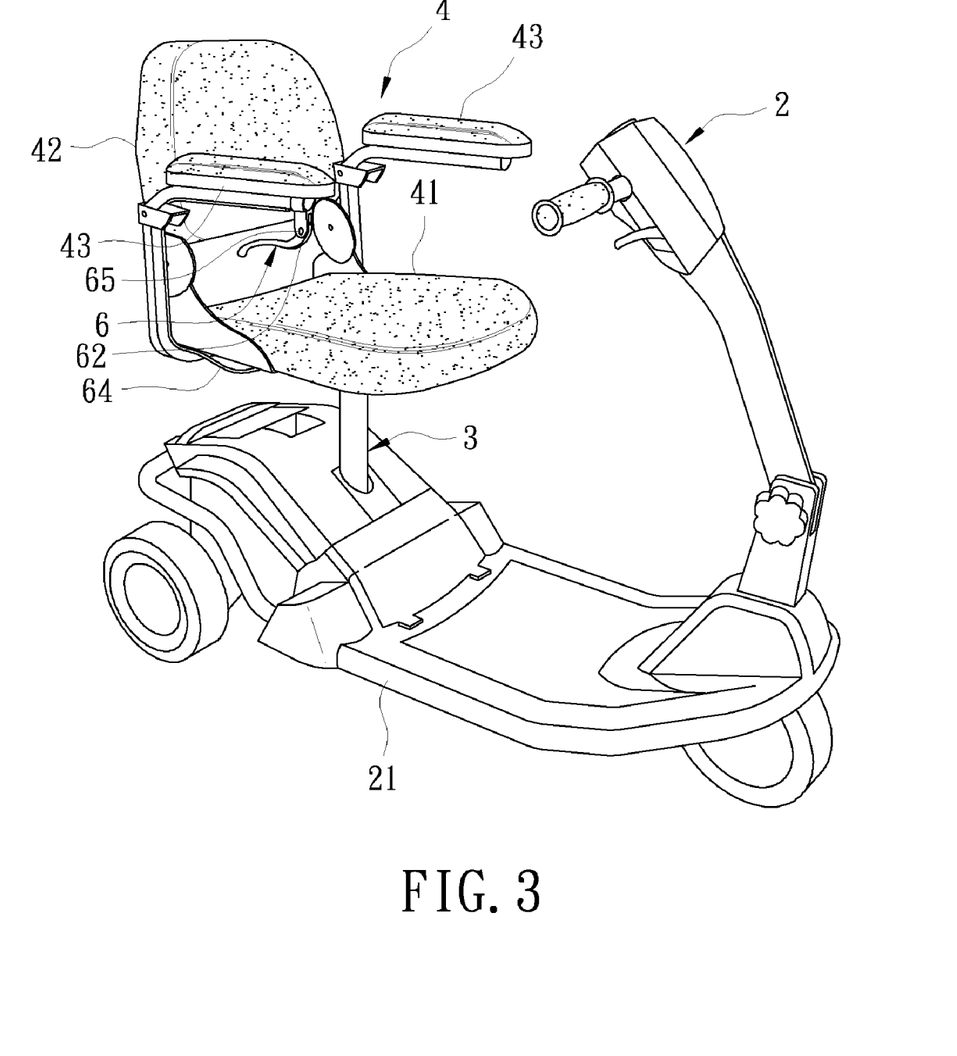
FIG. 3 is a perspective view of the preferred embodiment of a chair mounting device according to this invention when assembled to a motor-driven wheeled vehicle.
Figure 4:
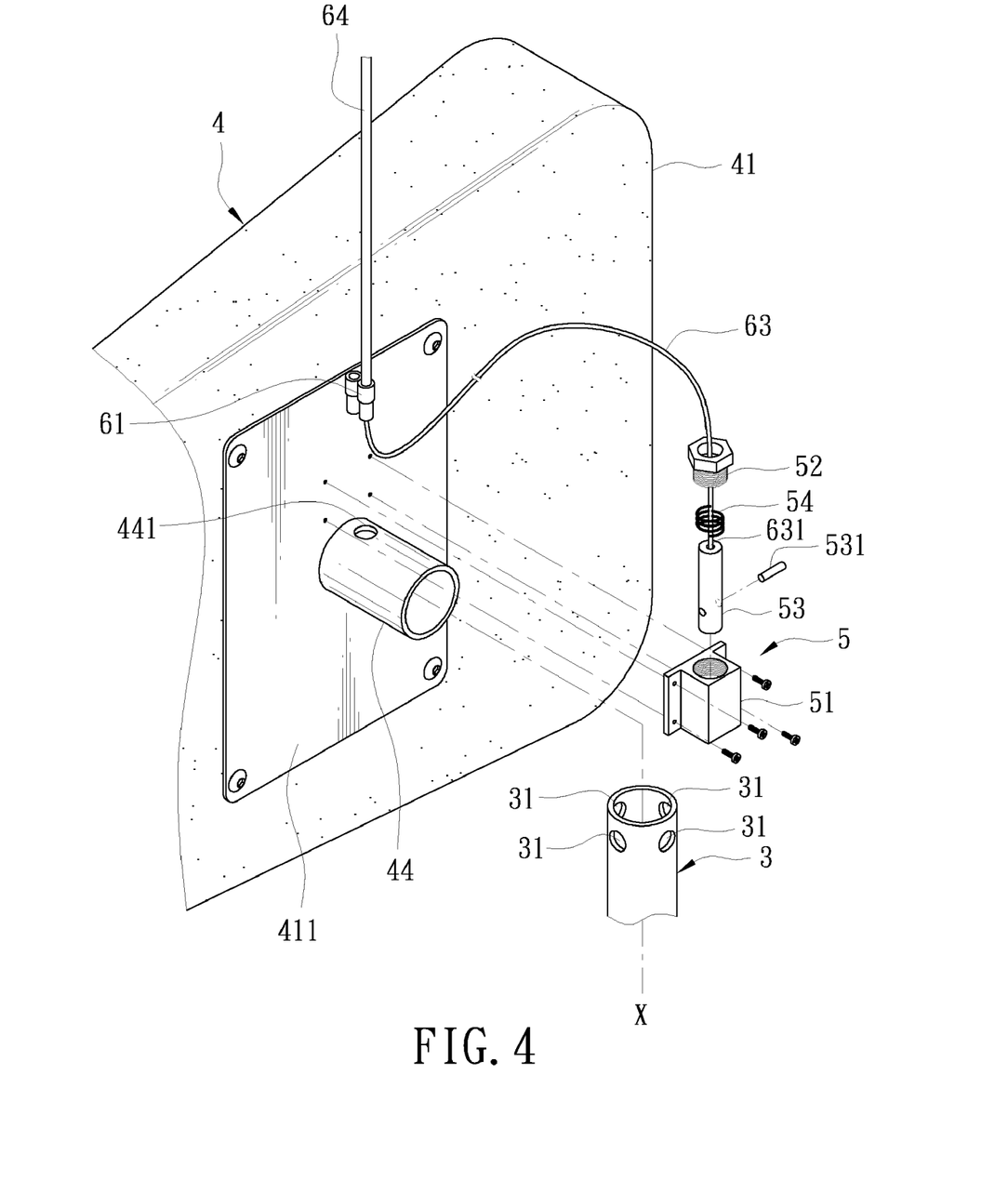
FIG. 4 is a fragmentary exploded perspective view of the preferred embodiment.
Figure 5:
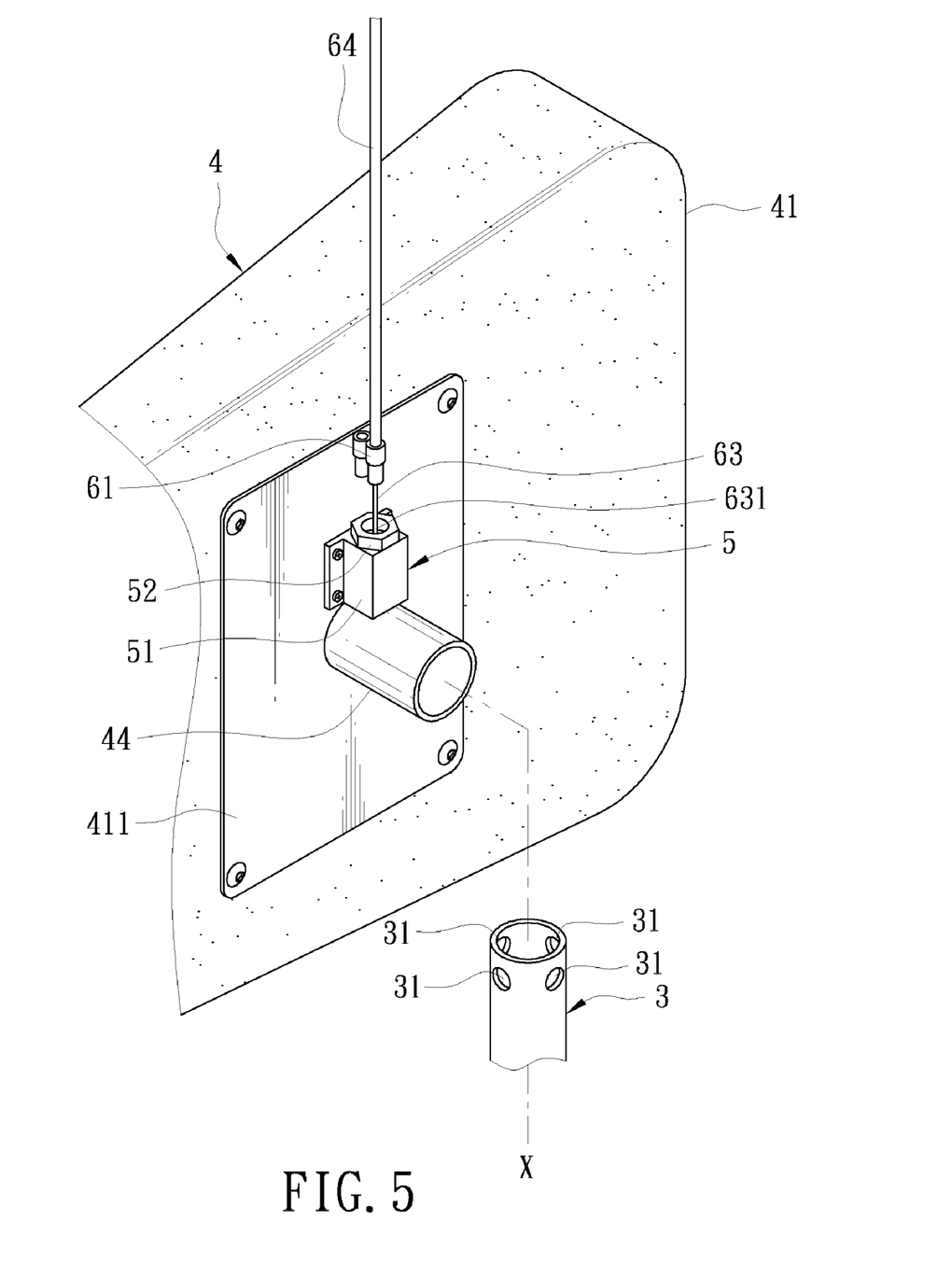
FIG. 5 is a partly exploded perspective view of the preferred embodiment.

Referring to FIGS. 3 to 5, the preferred embodiment of a chair mounting device according to the present invention is adapted to mount a chair 4 on a mounting frame 21 of a motor-driven wheeled vehicle 2 (or an electrically driven wheeled chair). The chair 4 includes a seat 41, two armrests 43 disposed respectively on two lateral sides of the seat 41 in an upright direction, and a backrest 42 disposed rearwardly of the seat 41. The chair mounting device of this embodiment is shown to comprise a seat post 3, a seat stem 44, a locking mechanism 5, and an operating mechanism 6.

The seat post 3 is adapted to be secured on and to extend from the mount frame 21 along a swivel axis (X) in the upright direction, and has a plurality of latch holes 31 angularly displaced from one another about the swivel axis (X).

The seat stem 44 is in the form of a seat tube 44 which is secured on and which extends from a bottom wall 411 of the seat 41. The seat tube 44 is sleeved on the seat post 3, and has a through hole 441 which extends radially therethrough and which is registered with a selected one of the latch holes 31 when the seat tube 44 is turned to perform a swiveling movement about the swivel axis (X).

Figure 7:
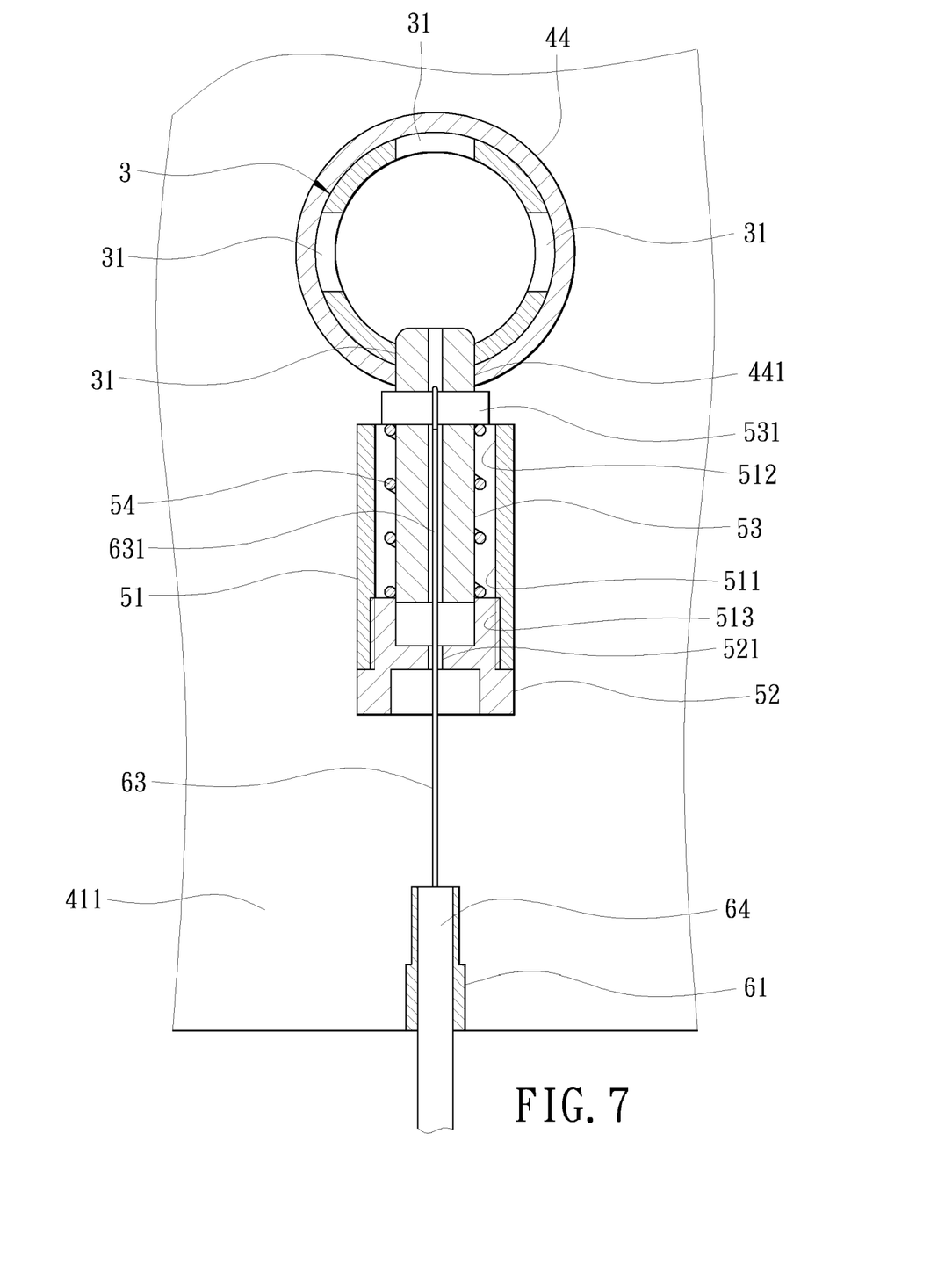
FIG. 7 is a fragmentary sectional view taken along VII-VII of FIG. 6, showing a locking member of the preferred embodiment in a locking position.

With reference to FIG. 7, the locking mechanism 5 includes a guiding member 51, a locking member 53, an end cap 52, a restricting lug 531, and a biasing member 54.

The guiding member 51 is secured on the bottom wall 411 of the seat 41, and has an inner tubular wall 511 which defines a tubular chamber to serve as a guideway, which extends in a radial direction relative to the swivel axis (X) and towards the through hole 441, and which has proximate and distal tubular end surfaces 512,513 relative to the through hole 441.

Figure 8:
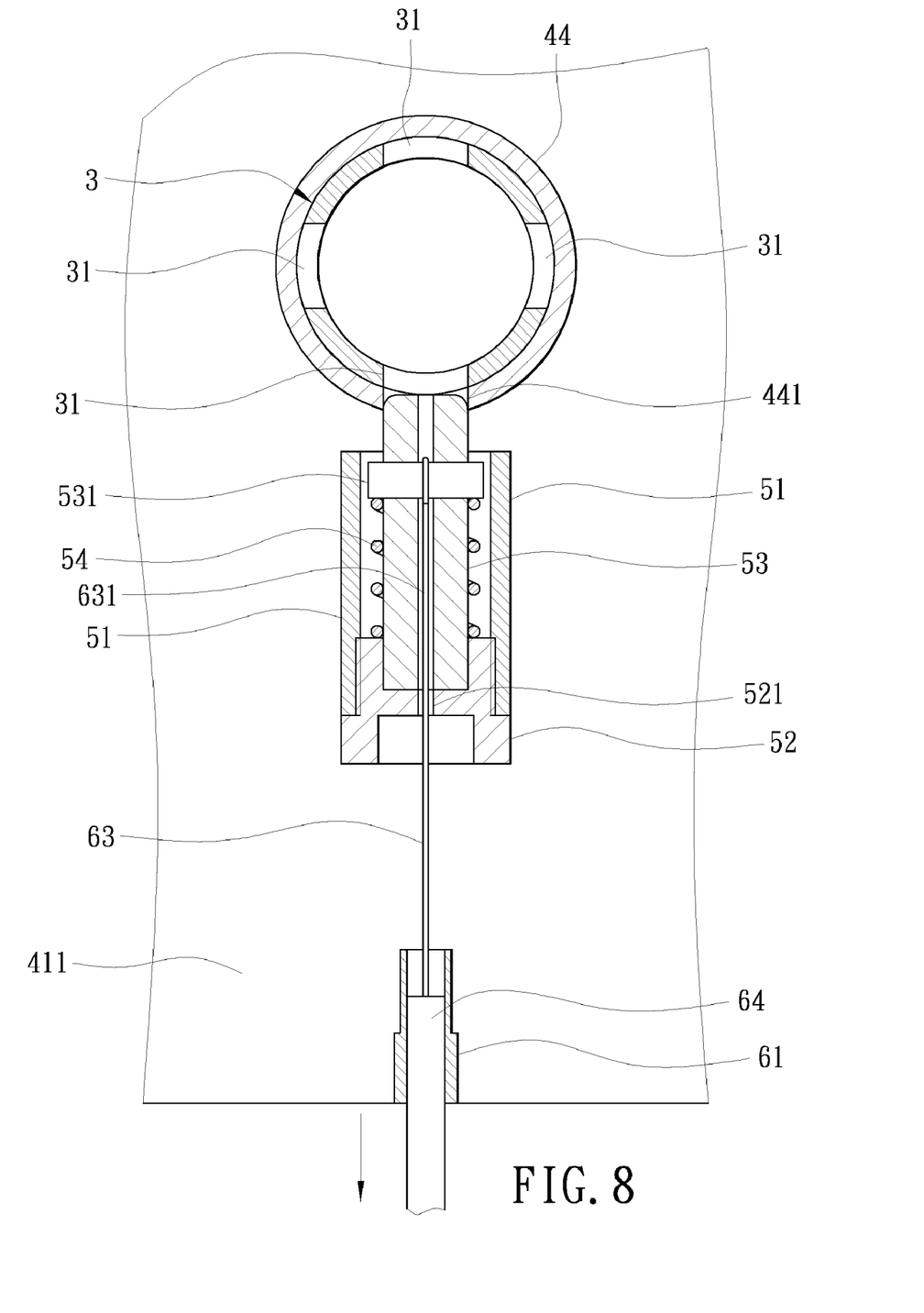
FIG. 8 is a fragmentary sectional view showing the locking member in an unlocking position.

The locking member 53 is in the form of a latch 53 which is movably disposed in the tubular chamber to be guided by the guideway and which extends through the through hole 441 so as to be movable between a locking position (as shown in FIG. 7), where the through hole 441 is registered with a selected one of the latch holes 31, and where the latch 53 is engaged in the selected one of the latch holes 31 so as to guard against swiveling movement of the seat tube 44 relative to the seat post 3, and an unlocking position (as shown in FIG. 8), where the latch 53 retreats radially to disengage from the selected one of the latch holes 31 such that the seat tube 44 is swivelable relative to the seat post 3.

The end cap 52 is threadedly engaged in the distal tubular end surface 513, and has a central hole 521. The restricting lug 531 extends radially and outwardly from the latch 53. The biasing member 54 is in the form of a coil spring 54 which is sleeved on the latch 53, and which has two ends respectively abutting against the end cap 52 and the restricting lug 531 so as to bias the latch 53 to the locking position. In addition, in the locking position, the restricting lug 531 is urged to abut against the seat tube 44 so as to limit the extent to which the latch 53 is inserted into the selected one of the latch holes 31.

Figure 6:
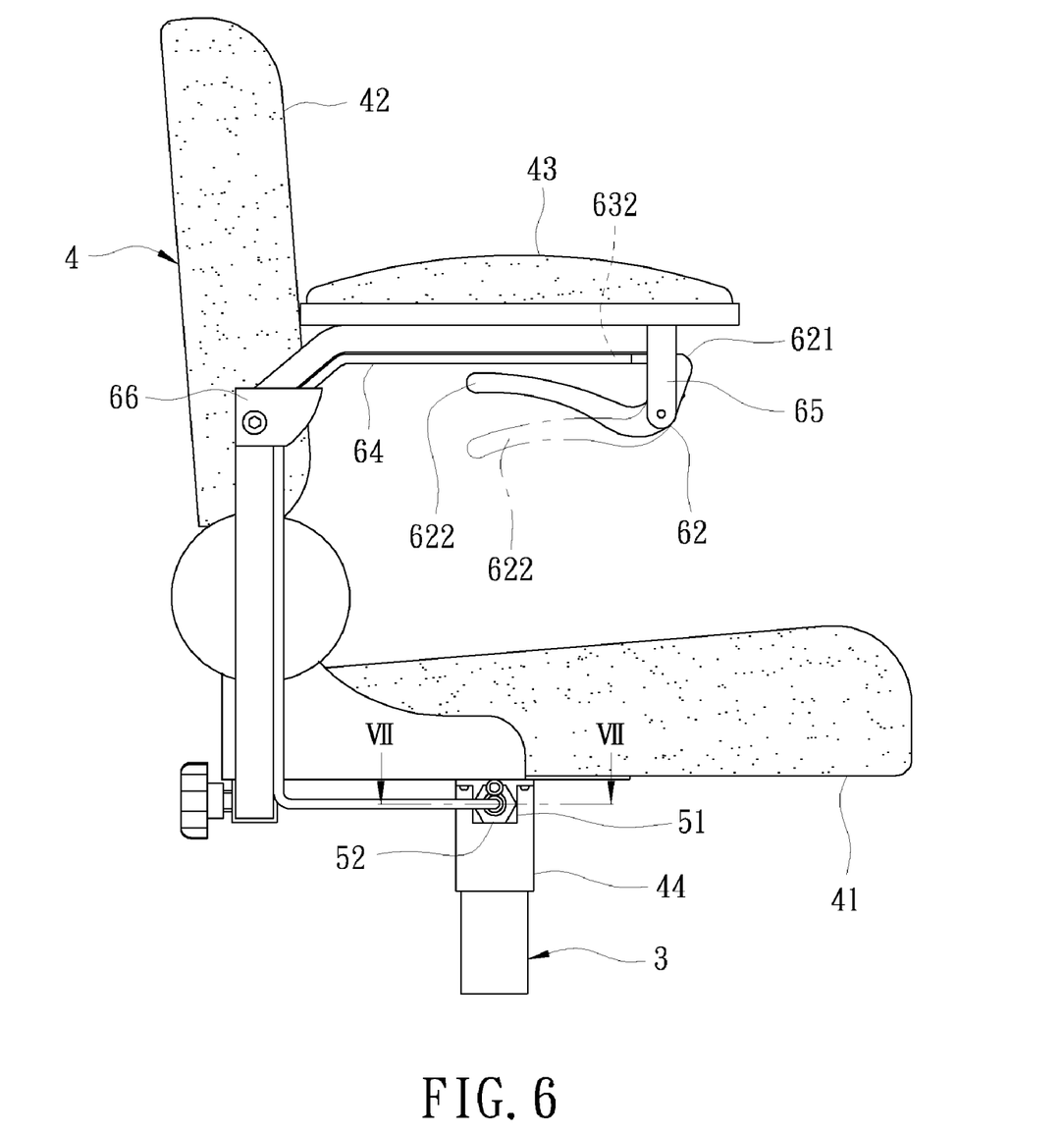
FIG. 6 is a schematic side view showing the chair mounting device of the preferred embodiment when assembled to the motor-driven wheeled vehicle.

With reference to FIGS. 5 to 7, the operating mechanism 6 includes an anchored mount 65, first and second cord guiding members 61,66, a lever 62, a pulling cord 63, and a protective tube 64.

The anchored mount 65 is secured on one of the armrests 43 to suspend from the mounting frame 21 in the upright direction. The first and second cord guiding members 61,66 are secured on the bottom wall 411 of the seat 41 and the backrest 42, respectively, and cooperate with the anchored mount 65 to define a guiding route.

The lever 62 is pivotally mounted on the anchored mount 65 at a fulcrum, and includes a power end 622 for exertion of a pressing force by a user, and a weight end 621 which is actuated by the pressing force to be turned relative to the anchored mount 65 about the fulcrum.

The pulling cord 63 is in the form of a steel wire 63, and includes a coupled end 631 which is coupled with the latch 53 through the central hole 521, and an intermediate segment which extends along the guiding route, i.e., through the first and second cord guiding members 61,66, to terminate at an actuated end 632 that is coupled with the weight end 621 of the lever 62. Thus, by pressing the power end 622 of the lever 62, the steel wire 63 is pulled against a biasing action of the coil spring 54 to displace the latch 53 from the locking position to the unlocking position such that the latch 53 is moved away from the seat post 3 to permit rotation of the chair 4 relative to the seat post 3.

The protective tube 64 is sleeved on the steel wire 63 to interconnect the first cord guiding member 61 and the anchored mount 65 through the second guiding member 66 along the guiding route.

As illustrated, the latch 53 is displaced from the locking position to the unlocking position by the steel wire 63 which is actuated by the lever 62 and which extends along the guiding route such that the lever 62 can be mounted at a location higher than the seat 41 of the chair 4, e.g., at one of the armrests 43 where the user can easily reach, thereby resulting in user convenience. In addition, the lever 62 is pivotally mounted on the anchored mount 65 so that the user can press the lever 62 effortlessly.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A chair mounting device for mounting a chair on a mounting frame of a motor-driven wheeled vehicle, the chair including a seat that has a bottom wall, two armrests that are disposed respectively above two lateral sides of the seat, and a backrest disposed rearwardly of the seat, said chair mounting device comprising:
    a seat post adapted to be mounted on and to extend from the mounting frame along a swivel axis in an upright direction, said seat post having a plurality of latch holes which are angularly displaced from one another about the swivel axis;
    a seat stem which is adapted to be mounted on and to extend from the bottom wall of the seat, and which is configured to be swivelable relative to said seat post about the swivel axis, said seat stem being a seat tube which is sleeved on said seat post, and which has a through hole that extends radially therethrough, and that is registered with a selected one of said latch holes when said seat tube is turned to perform swiveling movement about the swivel axis;
    a locking member which is a latch, and which is disposed to be movable relative to said seat stem in a radial direction relative to the swivel axis between a locking position, where said seat stem is guarded against swiveling movement relative to said seat post, and an unlocking position, where said seat stem is swivelable relative to said seat post;
    an anchored mount adapted to be secured to one of the armrests;
    a lever which is mounted on and which is operable relative to said anchored mount;
    a biasing member which is a coil spring and which is sleeved on said latch to bias said locking member to the locking position;
    a pulling cord including a coupled end which is coupled with said locking member, and an intermediate segment which extends along a guiding route to terminate at an actuated end which is coupled with said lever such that, by means of operation of said lever relative to said anchored mount, said pulling cord is pulled against a biasing action of said biasing member to pull said latch from the locking position, where said through hole is registered with the selected one of said latch holes, and where said latch is engaged in the selected one of said latch holes, to the unlocking position, where said latch retreats radially to disengage from the selected one of said latch holes;
    a guiding member which defines a guideway that extends in a radial direction relative to the swivel axis and towards said through hole so as to guide said latch to pass through said through hole, said guiding member having an inner tubular wall which extends to terminate at proximate and distal tubular end surfaces relative to said through hole, and which defines a tubular chamber that serves as the guideway to guide said latch;
    an end cap which is engaged in said distal tubular end surface for abutment of an end of said coil spring thereagainst, and which has a central hole which permits passage of said pulling cord therethrough; and
    a restricting lug which extends radially and outwardly from said latch to engage the other end of said coil spring such that, in the locking position, said restricting lug is urged to abut against said seat tube so as to limit extent of insertion of said latch into said selected one of said latch holes.

2. The chair mounting device according to claim 1, wherein the guiding route is configured to extend from said anchored mount through the backrest and the bottom wall of the seat to said locking member.

3. A chair mounting device for mounting a chair on a mounting frame of a motor-driven wheeled vehicle, the chair including a seat that has a bottom wall, two armrests that are disposed respectively above two lateral sides of the seat, and a backrest disposed rearwardly of the seat, said chair mounting device comprising:

a seat post adapted to be mounted on and to extend from the mounting frame along a swivel axis in an upright direction;

a seat stem which is adapted to be mounted on and to extend from the bottom wall of the seat, and which is configured to be swivelable relative to said seat post about the swivel axis;

a locking member which is disposed to be movable relative to said seat stem in a radial direction relative to the swivel axis between a locking position, where said seat stem is guarded against swiveling movement relative to said seat post, and an unlocking position, where said seat stem is swivelable relative to said seat post;

an anchored mount adapted to be disposed on one of the armrests;

a lever which is mounted on and which is operable relative to said anchored mount;

a biasing member disposed to bias said locking member to the locking position;

a pulling cord including a coupled end which is coupled with said locking member, and an intermediate segment which extends along a guiding route to terminate at an actuated end which is coupled with said lever such that, by means of operation of said lever relative to said anchored mount, said pulling cord is pulled against a biasing action of said biasing member to displace said locking member from the locking position to the unlocking position; and first and second cord guiding members which are adapted to be secured on the bottom wall and the backrest, respectively, and which cooperate with said anchored mount to define the guiding route for passage of said pulling cord.

4. The chair mounting device according to claim 3, wherein said pulling cord is a steel wire, and said lever is pivotally mounted on said anchored mount at a fulcrum, and includes a power end for exertion of a pressing force by a user, and a weight end coupled with said steel wire and configured to be actuated by the pressing force to turn said weight end relative to said anchored mount about the fulcrum so as to pull said steel wire, thereby moving said locking member away from said seat post.

5. The chair mounting device according to claim 4, further comprising a protective tube which interconnects said first cord guiding member and said anchored mount so as to define the guiding route and which is configured for receiving said steel wire.

* * * * *